(12) United States Patent
Walker

(10) Patent No.: US 11,673,814 B2
(45) Date of Patent: *Jun. 13, 2023

(54) IRON-BASED DESALINATION

(71) Applicant: Badwater Alchemy Holdings LLC, Seattle, WA (US)

(72) Inventor: William J. Walker, Seattle, WA (US)

(73) Assignee: Badwater Alchemy Holdings LLC, Seattle, WA (US)

( * ) Notice: Subject to any disclaimer, the term of this patent is extended or adjusted under 35 U.S.C. 154(b) by 192 days.

This patent is subject to a terminal disclaimer.

(21) Appl. No.: 17/175,034

(22) Filed: Feb. 12, 2021

(65) Prior Publication Data

US 2021/0238059 A1 Aug. 5, 2021

Related U.S. Application Data

(63) Continuation of application No. 16/536,909, filed on Aug. 9, 2019, now Pat. No. 10,919,784.
(Continued)

(51) Int. Cl.
*C02F 1/28* (2023.01)
*C02F 1/44* (2023.01)
(Continued)

(52) U.S. Cl.
CPC ............ *C02F 1/281* (2013.01); *B01D 24/105* (2013.01); *B01D 37/00* (2013.01);
(Continued)

(58) Field of Classification Search
CPC .......... C02F 1/281; C02F 1/288; C02F 1/705; C02F 1/441; C02F 2305/08; C02F 2103/08; C02F 2103/10; C02F 2209/05; C02F 1/008; C02F 1/28; C02F 1/44; C02F 1/58; C02F 2209/10; Y02A 20/131; B01D 61/02; B01D 61/022; B01D 61/027;
(Continued)

(56) References Cited

U.S. PATENT DOCUMENTS 8,366,940 B2  2/2013  Berkowitz et al.
9,359,228 B2  6/2016  Bezbaruah et al.
(Continued)

FOREIGN PATENT DOCUMENTS

| ES | 2598032 | * | 1/2017 | ................ C02F 1/48 |
| KR | 101768703 | | 8/2017 | |
| WO | WO2018178980 | * | 10/2018 | ............. C04B 20/12 |

OTHER PUBLICATIONS

Office of the Deputy Prime Minister, "Salt-Mineral Planning Factsheet", British Geological Survey-Natural Environmental Research Council, Published Jan. 2006. (Year: 2006).*
(Continued)

*Primary Examiner* — Joseph W Drodge
(74) *Attorney, Agent, or Firm* — Lee & Hayes, P.C.

(57) ABSTRACT

Systems, devices, and techniques described herein relate to iron-based desalination of water. In some cases, an inflow of water including chlorine and sodium can be received. A plurality of iron nanoparticles may capture the chlorine and the sodium. The iron nanoparticles may at least partially include Zero Valent Iron (ZVI). An outflow of the water may be emitted. The chlorine and the sodium may be omitted from the outflow.

20 Claims, 10 Drawing Sheets

Related U.S. Application Data

(60) Provisional application No. 62/719,494, filed on Aug. 17, 2018.

(51) Int. Cl.

| | | |
|---|---|---|
| *C02F 1/70* | (2023.01) | |
| *C22B 5/00* | (2006.01) | |
| *B01J 20/02* | (2006.01) | |
| *B01D 61/04* | (2006.01) | |
| *B01D 24/10* | (2006.01) | |
| *B01D 37/00* | (2006.01) | |
| *B01D 39/20* | (2006.01) | |
| *C02F 103/08* | (2006.01) | |

(52) U.S. Cl.
CPC ......... *B01D 39/2072* (2013.01); *B01D 61/04* (2013.01); *B01J 20/0229* (2013.01); *C02F 1/288* (2013.01); *C02F 1/441* (2013.01); *C02F 1/705* (2013.01); *C22B 5/00* (2013.01); *B01D 2311/2626* (2013.01); *C02F 2103/08* (2013.01); *C02F 2305/08* (2013.01)

(58) Field of Classification Search
CPC ............ B01D 67/0039; B01D 67/0041; B01D 71/022; B01D 2257/2025; B01D 2311/24; B01D 2311/243; B01D 2311/246; B01D 2311/2669; B01D 2317/02; B01D 2317/022; B01D 2317/025; B01D 2319/02; B01D 2319/022; B01D 2319/025; B01D 61/04; B01D 2311/2626; B01D 24/02; B01D 24/10; B01D 24/105; B01D 24/20; B01D 24/205; B01D 37/00; B01D 39/20; B01D 39/2072; B01D 2239/0645; B01D 2239/086; B01D 2239/1216; B01J 20/02; B01J 20/0225; B01J 20/0229; B01J 20/28007; B01J 20/28026; B01J 20/28033; C22B 5/00; C21D 10/00; C21D 2201/00; C21D 2281/00

USPC ....... 210/638, 652, 653, 660, 679, 681, 739; 423/138–140; 502/400, 406; 977/773, 977/778, 810

See application file for complete search history.

(56) References Cited

U.S. PATENT DOCUMENTS

| | | |
|---|---|---|
| 9,610,561 B2 | 4/2017 | Addiego et al. |
| 9,776,891 B2 | 10/2017 | Addiego et al. |
| 9,988,285 B2 | 6/2018 | Dong |
| 10,919,784 B2* | 2/2021 | Walker .............. C02F 1/288 |
| 2006/0083924 A1 | 4/2006 | Feitz et al. |
| 2007/0203388 A1 | 8/2007 | Zhao et al. |
| 2007/0256985 A1 | 11/2007 | Zhao et al. |
| 2012/0018382 A1 | 1/2012 | Stein |
| 2012/0255898 A1 | 10/2012 | Buschmann |
| 2015/0001156 A1 | 1/2015 | Johnson |
| 2015/0291446 A1* | 10/2015 | Addiego ............ B01J 20/28007 252/178 |
| 2015/0353385 A1 | 12/2015 | Wang et al. |
| 2015/0375302 A1 | 12/2015 | Deb |
| 2016/0016118 A1 | 1/2016 | Lai et al. |
| 2016/0052808 A1 | 2/2016 | Huang |
| 2017/0028349 A1 | 2/2017 | Blandin et al. |
| 2017/0129792 A1 | 5/2017 | Huang et al. |
| 2017/0266670 A1 | 9/2017 | Stein |
| 2017/0297931 A1 | 10/2017 | Ghoshal et al. |
| 2017/0334755 A1 | 11/2017 | Yan et al. |
| 2018/0099877 A1 | 4/2018 | Chang et al. |
| 2018/0104653 A1 | 4/2018 | Zhang et al. |
| 2018/0344786 A1* | 12/2018 | Thacker, Jr. ......... A61K 31/045 |
| 2018/0344790 A1* | 12/2018 | Vu .............. A24D 1/18 |
| 2019/0193088 A1 | 6/2019 | Stein |
| 2020/0055748 A1 | 2/2020 | Walker |
| 2020/0129931 A1 | 4/2020 | Ma et al. |

OTHER PUBLICATIONS

Gonzalez, machine English translation of Document ES2598032, published Jan. 2017 (Year: 2017).*

Office Action for U.S. Appl. No. 16/536,909, dated Aug. 19, 2020, Walker, "Iron-Based Desalination", 12 pages.

* cited by examiner

IRON-BASED DESALINATION

CROSS-REFERENCE TO RELATED APPLICATIONS

This application is a continuation of U.S. patent application Ser. No. 16/536,909, now U.S. Pat. No. 10,919,784, filed on Aug. 9, 2019, which claims the benefit of priority to U.S. Provisional Application No. 62/719,494, filed on Aug. 17, 2018, all of which are incorporated herein by reference in their entirety.

BACKGROUND

The vast majority of the Earth's water is saline. Some sources estimate that only about 2.5% of the Earth's water is freshwater. Saline, however, is typically unusable as drinking water and for many agricultural uses. According to the United Nations (UN), 14% of the world's population will encounter water scarcity by 2025. Some communities, such as Saudi Arabia and Kuwait, already rely on desalination to supply drinking water and fresh water for agricultural uses.

With the increasing pressure to find usable water resources for drinking, industrial, agricultural, and livestock uses, a variety of technologies are in development to improve water quality. Various governmental agencies, such as the United States (US) Environmental Protection Agency (EPA) require factories to reduce an amount of Total Dissolved Solids (TDS) in wastewater. TDS include various ions and particles that can pass through a filter with pores of around 2 microns in size. Water with a high TDS level can significantly disrupt the water balance of biological cells, which can sometimes lead to death. In addition, water with a high TDS level may be opaque, which may reduce photosynthesis in plants exposed to the water. A high TDS level may also increase water temperature. Accordingly, the US EPA requires agricultural water to have a TDS of 1,500 milligrams per liter (mg/L) or less and drinking water to have a TDS of 500 mg/L or less. Because most of the earth's surface water and groundwater exceeds these standards, most surface water and groundwater is unsuitable for agricultural, industrial, or drinking uses. Desalination technologies are increasingly essential for providing safe water to farms and individuals throughout the world. Desalination techniques are also required by many industries that produce saline as a result of industrial processes.

Various desalination technologies have been utilized to remove salt ions from saline. One example technique is distillation. In a distillation process, saline water can be heated, leading to water evaporation. The evaporated water can be condensed and collected as desalinated water. Another example desalination technique is Reverse Osmosis (RO). In an RO process, saline water is pressurized on a first side of a water-permeable membrane. Solute in the saline water (e.g., salt) remains on the first side, and substantially pure water can pass through to the second side of the water-permeable membrane through the membrane itself. In addition to distillation and RO, Ion Exchange (IX) and electrodialysis may be used to desalinate water.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
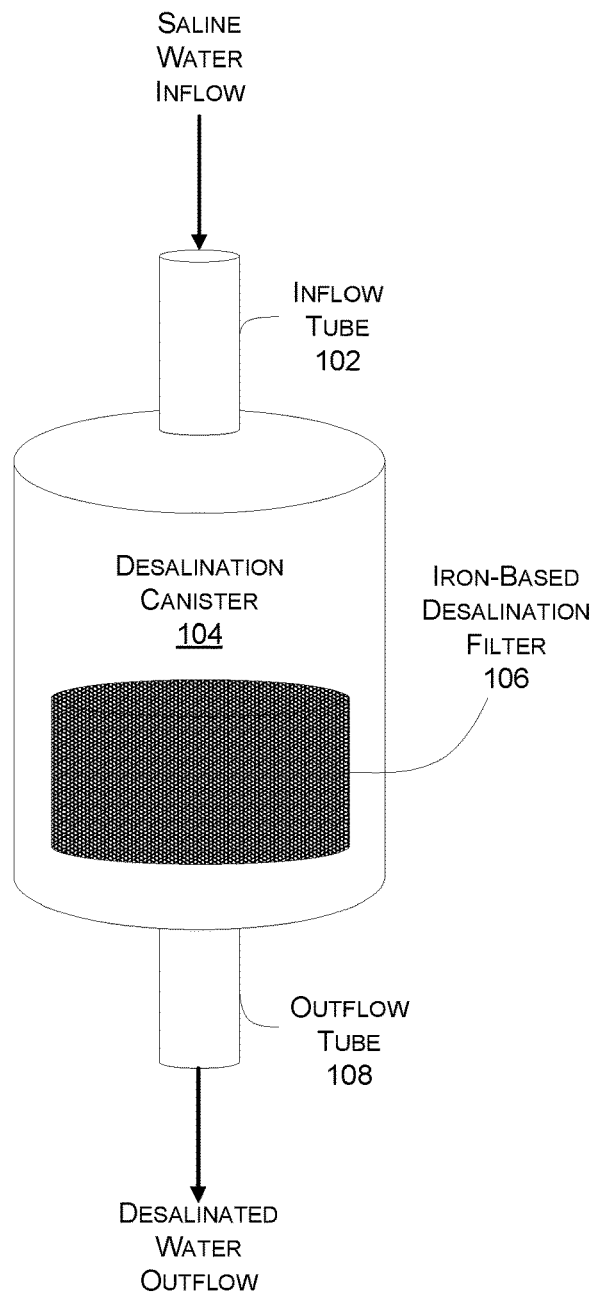
FIG. 1 illustrates an example desalination component.

The systems, devices, and methods described herein relate to a novel water desalination technique using iron nanoparticles. When saline contacts the iron nanoparticles, sodium and chlorine (e.g., components of table salt) can be retained on the surface of the iron nanoparticles. Accordingly, the iron nanoparticles can significantly reduce the amount of salt in the saline.

Existing desalination techniques, such as distillation RO, IX, and electrodialysis, have a number of drawbacks compared to various iron-based desalination implementations disclosed herein. Techniques such as distillation, RO, and electrodialysis require a significant energy expenditure. For instance, distillation can require a great amount of thermal energy to cause the water in a saline sample to evaporate. In various examples, RO requires a great deal of energy to impose pressure on a saline sample being desalinated. The significant energy requirements of distillation and RO can be extraordinarily costly, particularly for industrial and agricultural applications requiring the desalination of a large amount of water. For instance, a typical 200 gallons per minute (gpm) RO plant may have a $2 million per year Operation and Management (OM) cost.

In various implementations of the present disclosure, saline can be significantly desalinated without the input of a significant amount of energy. In some examples, iron nanoparticles can be held in a cannister through which saline can passively drip due to gravity. Accordingly, various implementations of the present disclosure can be associated with lower energy expenditures and lower OM costs than other desalination alternatives, such as distillation and RO.

Another significant problem with RO and other desalination techniques is the production of highly concentrated saline as a byproduct. When water leaves a saline sample through the water-permeable membrane, the saline left behind is highly concentrated. Highly concentrated saline is difficult to dispose of. For example, if the highly concentrated saline enters groundwater supply, it can contaminate the groundwater and render it unusable as drinking water or for agricultural purposes. Accordingly, some industries must store the highly concentrated saline in large vats with walls impermeable to the saline. Storing the concentrated saline introduces additional costs to RO.

In various implementations of the present disclosure, salt can be captured from saline in a solid form. For instance, salt can attach to iron nanoparticles during a desalination process. The salt attached to the iron nanoparticles can be disposed of as a solid, rather than as highly concentrated saline. Solid salt disposal may be significantly less costly than disposal of highly concentrated saline.

Various desalination techniques can be costly to implement. For instance, a 200 gpm RO plant may have a capital cost of $5-10 million and a $2 million per year OM cost. In contrast, various techniques described herein can be implemented in a relatively low-cost desalination plant. Due to the minimal energy expenditure required for operation, as well as the relatively inexpensive constituent materials of iron nanoparticles, various implementations described herein can be implemented as a 200 gpm plant that costs as little as $250,000 in capital cost with an OM cost of less than $75,000. Accordingly, various implementations of the present disclosure may significantly improve access to desalination technologies for various industries and individuals throughout the world.

Various implementations of the present disclosure will now be described with reference to the accompanying figures.

FIG. 1 illustrates an example desalination component 100. In various implementations of desalination systems disclosed herein, at least one of the desalination component 100 can be utilized to desalinate water. In some cases, the desalination component 100 can be used to passively desalinate water.

In the illustrated desalination component 100, saline water may enter through an inflow tube 102. Any vessel through which saline water can flow may be suitable as the inflow tube 102. For instance, the inflow tube 102 may include at least one of a metal (e.g., steel, copper, etc.) pipe, a plastic (e.g., silicone, Polyvinyl Chloride (PVC), butadiene, etc.) tube, or their equivalents. In some cases, the inflow tube 102 includes a material that is resistance to degradation by saline. As used herein, the terms "saline," "saline water," and their equivalents, can refer to water including dissolved sodium and chlorine ions. In some cases, saline water may include additional components, such as other ions, contaminants, and particles.

The saline water may flow from the inflow tube 102 into a desalination canister 104 that includes an iron-based desalination filter 106. The inflow tube 102 may be sealed onto an inlet port of the desalination canister 104. For instance, a compressible o-ring (including, e.g., silicone, butadiene, or the like) may be compressed between the inflow tube 102 and the desalination canister 104. In some cases, the inflow tube 102 may be chemically bonded or heat-bonded to the desalination canister 104.

In various implementations, the desalination filter 106 may be disposed inside of a solid housing configured to hold fluid (e.g., water) in contact with the desalination filter 106. According to some example implementations, the housing may be equipped with a removable component, through which the iron-based desalination filter 106 can be removed and/or replaced. For instance, the housing may have a removable lid.

According to implementations of the present disclosure, the desalination filter 106 may include iron. In some implementations, the iron may be in the form of iron nanoparticles. As used herein, the term "nanoparticle," and its equivalents, can refer to a solid particle that is shorter than 100 nanometers (nm) in at least one dimension. In some cases, a nanoparticle can have a diameter of less than 100 nm. An iron nanoparticle, for example, can be a nanoparticle including (and possibly consisting of) iron atoms. In some cases, an iron nanoparticle may include a network structure of iron atoms that are covalently bonded to each other. The network structure may be cubic.

As used herein, a "size," "length," "diameter," or their equivalents of a particle may refer to a Z-average diameter (e.g., as determined using Dynamic Light Scattering (DLS)). In some cases, a "size," "length," "diameter," or their equivalents, of multiple particles may refer to a Z-average diameter in which the particles have a weighted differential size distribution within ±10% of the Z-average diameter. In various implementations described herein, the iron nanoparticles may, for instance, may be assumed to have spherical shapes, such that a Z-average diameter of the nanoparticles (e.g., generated using DLS) in suspension may be between 1 and 100 nm. In some cases, the nanoparticles may have a Z-average diameter that is between 40 to 60 nm, such as about 50 nm. In some implementations, at least 90% of a (volume or intensity) weighted differential size distribution of the nanoparticles in solution (e.g., generated using DLS) may be between 20 and 80 nm, such as about 50 nm. In some cases, a particle's length can be defined by microscope measurements (e.g., via at least one optical microscope, an electron microscope, a scanning probe microscope, or the like), settling velocities (e.g., by applying Stokes' law to a measured velocity of the particle), and/or sedimentation methods.

In various instances, the nanoparticles in the iron-based desalination filter 106 may include ZVI. As used herein, the term "Zero Valent Iron (ZVI)," "zerovalent iron," "nonvalent iron," "Fe(0)," and their equivalents, can refer to one or more iron atoms with a valency of zero. In some cases, iron can change between a zerovalent state and a multivalent state, such as the trivalent Fe' form.

When ZVI atoms on the surface of the nanoparticles in the iron-based desalination filter 106 becomes oxidized, the atoms may be converted into multivalent iron atoms. As used herein, the term "oxidation," and its equivalents, can refer to a chemical reaction in which at least one atom loses electrons. As used herein, the term "reduction," and its equivalents, can refer to a chemical reaction in which at least one atom gains electrons. In a "reduction-oxidation" or "redox" reaction, electrons are transferred from one chemical species (e.g., a species undergoing oxidation) to another chemical species (e.g., a species undergoing reduction). For example, ZVI can be oxidized according to the following Equation 1:

$$4Fe + 3O_2 \xrightarrow{yields} 2Fe_2O_3$$

Wherein the 4Fe term includes ZVI, and the iron in the $2Fe_2O_3$ term includes multivalent Fe(III).

When ZVI is converted to multivalent iron, the multivalent iron atoms may be charged. Some iron atoms may be negatively charged or positively charged, based on their respective valencies. In some examples, sodium and chlorine ions dissolved in the saline may be attracted to the charged multivalent iron atoms on the surfaces of the nanoparticles in the iron-based desalination filter 106 due to electrostatic forces between the ions and the multivalent iron atoms. In some instances, the sodium and chlorine atoms may become covalently bonded to each other and/or iron on the surface of the iron nanoparticles. Accordingly, the sodium and chlorine atoms in the saline may be adsorbed onto the surfaces of the iron nanoparticles in the iron-based desalination filter 106.

The iron nanoparticles may be packed inside of the iron-based desalination filter 106. In some cases, the iron nanoparticles may covalently bond, or otherwise stick to one another, wherein pores may be present between the iron nanoparticles. In some cases, the sodium and chlorine atoms may assemble into a cubic crystal structure within the pores. For instance, the sodium and chlorine may assemble into halite crystals within the pores.

By capturing the sodium and chlorine atoms in the iron-based desalination filter 106, the iron-based desalination filter 106 may extract sodium and chlorine ions from the saline, thereby generating desalinated water. In various implementations, the desalinated water may flow out of the desalination canister through an outflow tube 108. Any vessel through which water can flow may be suitable as the outflow tube 108. For instance, the outflow tube 108 may include at least one of a metal (e.g., steel, copper, etc.) pipe, a plastic (e.g., silicone, PVC, butadiene, etc.) tube, or their equivalents. The outflow tube 108 may be sealed onto an inlet port of the desalination canister 104. For instance, a compressible o-ring (including, e.g., silicone, butadiene, or the like) may be compressed between the outflow tube 108 and the desalination canister 104. In some cases, the outflow tube 108 may be chemically bonded or heat-bonded to the desalination canister 104.

Although implementations of the desalination component 100 described with reference to FIG. 1 indicate that water is actively flowing through the desalination component 100, implementations are not so limited. The nanoparticles in the iron-based desalination filter 106 may actively capture sodium and chlorine ions in saline that is statically held inside of the desalination canister 104. For instance, various sodium and chlorine ions may move (e.g., via Brownian motion) through static (i.e., non-flowing) saline. When the sodium and chlorine ions encounter surfaces of the nanoparticles in the iron-based desalination filter 106, the sodium and chlorine atoms can become adsorbed onto the surfaces of the surfaces of the nanoparticles. Thus, the saline may become gradually desalinated even when it is held statically in contact with the iron-based desalination filter 106.

Figure 2:
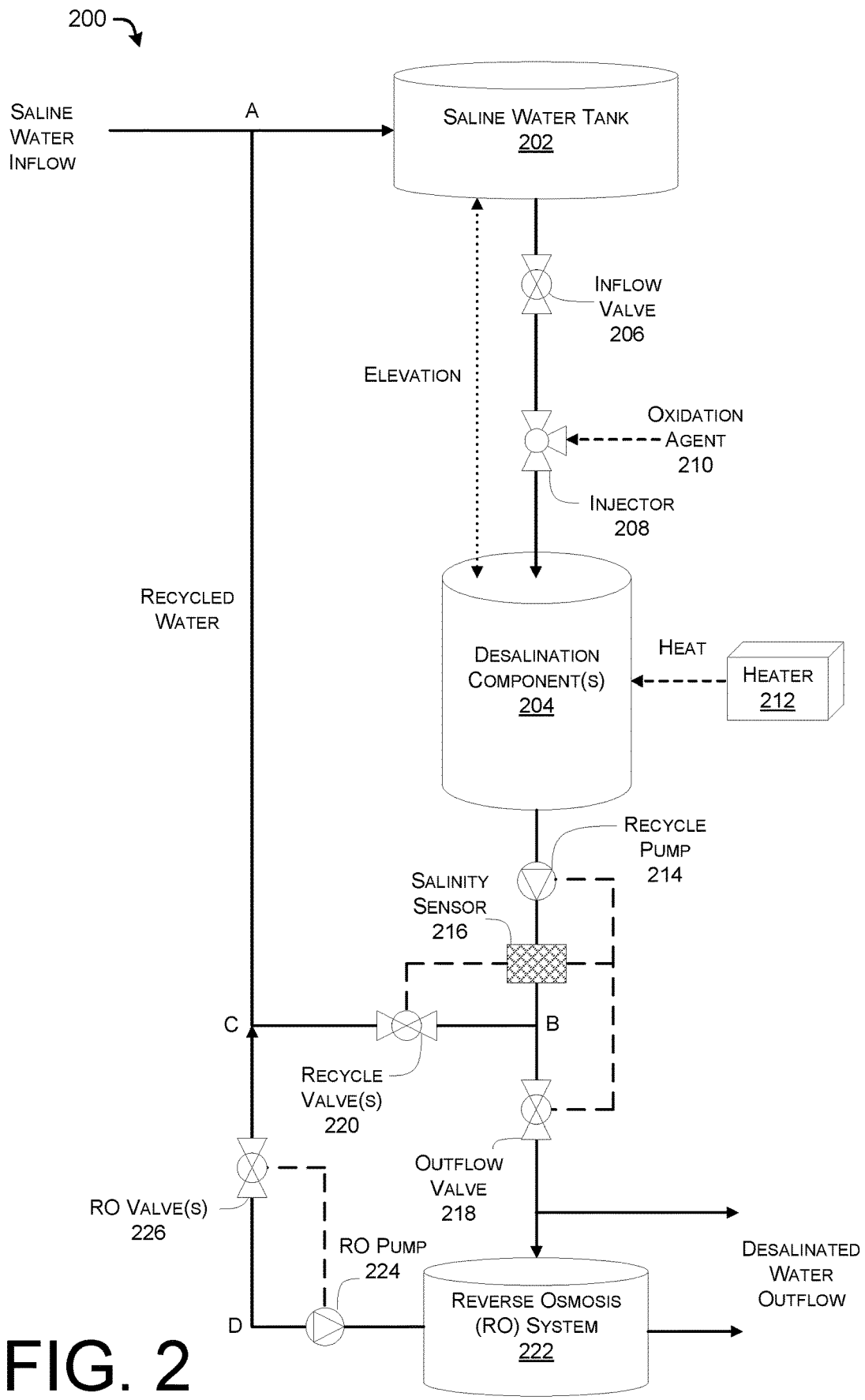
FIG. 2 illustrates an example desalination system with at least one desalination component.

FIG. 2 illustrates an example desalination system 200 with at least one desalination component. In various implementations, the desalination system 200 can be used to desalinate industrial runoff, mining wastewater, seawater, or the like. In some cases, the desalination system 200 can be used to reduce TDS levels in saline below acceptable levels (e.g., as defined by the US EPA) for disposal into the ground, for agricultural uses, for drinking water, or the like. As illustrated in FIG. 2, the desalination system 200 may include a fluid circuit that includes points A, B, C, and D. Water may progress through the fluid circuit passively (e.g., via gravity) and/or actively (e.g., via the actions of one or more pumps).

In various implementations, saline water may flow into the system 200. The saline water may be held in a saline water tank 202. The saline water tank 202 may include a storage chamber configured to hold the saline water. The saline water tank 202 may have one or more inlets and/or one or more outlets. For instance, the saline water tank 202 may receive the saline water by an inlet and may release the saline water by an outlet. The saline water tank 202 may have any suitable shape for temporarily storing the saline water. For instance, the saline water tank 202 may be cylindrical, spherical, prismatic, or the like. The saline water tank 202 may have one or more walls in contact with the saline water. The walls may include, for instance, a material resistance to degradation by the saline, such as plastic (e.g., cross-linked polyethylene, fiberglass reinforced plastic, etc.), metal (e.g., steel), or the like.

Water held in the saline water tank 202 may flow through a portion of a fluid circuit into one or more desalination components 204 (e.g., one or more of the desalination components 100 described above with reference to FIG. 1). The fluid circuit may include, for example, at least one of pipes, tubes, any vessel through which fluid can flow, or the like. In some cases, the water can flow from the saline water tank 202 to the desalination component(s) 204 via hydrostatic pressure. For instance, the saline water tank 202 may be positioned at a higher elevation than the desalination component(s) 204, thereby generating a hydrostatic pressure. Gravity may propel the saline water from the saline water tank 202 to the desalination component(s) 204, in various implementations. Accordingly, in some cases, the water can passively flow into the desalination component(s) 204 from the saline water tank 202.

The desalination component(s) 204 may include one or more desalination canisters, such as the desalination canister 104 described above with reference to FIG. 1. In some cases, multiple desalination components 204 can be connected to each other in series. For instance, an inflow tube of one desalination component 204 may be connected to an outflow tube of another desalination component 204, such that water flowing through the desalination components 204 may be desalinated by both desalination components 204. When multiple desalination components 204 are connected to each other in series, a greater amount of sodium and chlorine can be extracted from water in a single pass through the fluid circuit, as compared to a single one of the desalination components 204. In some examples, multiple desalination components 204 can be connected to each other in parallel. For instance, an inflow tube of one desalination component 204 may be connected to an inflow tube of another desalination component 204, such that water flowing through the desalination components 204 may be split between the two desalination components 204. When multiple desalination components 204 are connected to each other in parallel, an overall flow rate through the desalination components 204 can increase.

In various implementations, a portion of the fluid circuit extending between the saline water tank 202 and the desalination component(s) 204 may include an inflow valve 206. The inflow valve 206 can include any of various types of valves. For instance, the inflow valve 206 may include at least one of a ball valve, a butterfly valve, a choke valve, a diaphragm valve, a gate valve, a globe valve, a knife valve, a needle valve, a pinch valve, a plug valve, a solenoid valve, a spool valve, or the like.

In some cases, the inflow valve 206 may be connected in series between the saline water tank 202 and the desalination component(s) 204. In various implementations, the inflow valve 208 may selectively allow or prevent the passage of water from the saline water tank 202 to the desalination component(s) 204. For instance, when the inflow valve 206 is in an "open" position, the water may flow from the saline water tank 202 to the desalination component(s) 204 through the inflow valve 206. When the inflow valve 206 is in a "closed" position, the inflow valve 206 may prevent the flow of water from the saline water tank 202 to the desalination component(s) 204 through the inflow valve 206. In some cases, the inflow valve 206 may limit or otherwise control the flow of water between the saline water tank 202 and the desalination component(s) 204. For example, when the inflow valve 206 is partially opened, the inflow valve 206 may limit the flow of water from the saline water tank 202 to the desalination component(s) 204.

In various implementations, the portion of the fluid circuit extending between the saline water tank 202 and the desalination component(s) 204 may include an injector 208, which may inject an oxidation agent 210 into the water flowing between the saline water tank 202 and the desalination component(s) 204. As used herein, the term "oxidation agent," and its equivalents, can refer to a substance that initiates oxidation of a chemical species. In various implementations, the oxidation agent 206 may cause, or exacerbate, oxidation of the iron in the desalination component(s) 204. The oxidation agent 206 may be in a solid form, a liquid form, an aqueous form, or a gaseous form. Some examples of the oxidation agent 206 include at least one of oxygen ($O_2$), ozone ($O_3$), hydrogen peroxide ($H_2O_2$), any other electron acceptor that does not introduce additional contamination (e.g., that would increase TDS) into the saline water, or the like. The injector 204 may include any device configured to input the oxidation agent 206 into the fluid circuit (e.g., into saline present in the fluid circuit). For instance, the injector 208 may be a fluid injector, a gas injector, or a liquid injector. Although not illustrated, in some cases, the injector 208 may inject a reducing agent (e.g., CO) into the water in order to control one or more chemical reactions performed in the desalination component(s) 204. For instance, if iron in the desalination component(s) 204 becomes clogged with halite, it might be advantageous to reduce the iron to unclog the desalination component(s) 204.

In some cases, the injector 208 can be selectively controlled by an external controller (not illustrated), which activate the injector 208 in response to identifying that one or more conditions are present. For example, the external controller could cause the injector 208 to deliver the oxidation agent 206 to water in the fluid circuit in response to receiving a user input requesting the delivery of the oxidation agent 206.

The water may flow into the desalination component(s) 204, which may at least partially desalinate the water. In various implementations, the desalination component(s) 204 can include at least one iron-based desalination filter (e.g., the iron-based desalination filter 106), which may include iron nanoparticles. When sodium and chlorine ions dissolved in the water contact the iron nanoparticles in the iron-based desalination filter, the ions may be attach to the iron nanoparticles. Accordingly, the sodium and chlorine ions may be retained on the iron-based desalination filter, and the salinity of the saline may be reduced.

In various implementations, the system 200 can include a heater 212 that provides heat to the water in the fluid circuit. As illustrated in FIG. 2, the heater 212 can provide heat to the desalination component(s) 204, however, in some examples, the heater 212 may provide heat to a component of the fluid circuit that is upstream of the desalination component(s) 204 (e.g., between the saline water tank 202 and the desalination component(s) 204). In some implementations, the heat provided by the heater 212 may increase the temperature of the water flowing through the desalination component(s) 204, which may increase the adsorption rate of the sodium and chlorine atoms on the iron nanoparticles. Various initial experiments indicate that the desalination rate increases significantly if the water is heated from 17° C. to 25° C. In some cases, a rate of the desalination (e.g., in terms of sodium and/or chlorine removed from the water over time) may increase by 10 to 15% if the water is heated by 10° C. In various implementations, the heater 212 could include a resistive material configured to emit heat when electric current runs through the resistive material. In some examples, the heater could include a Peltier element. In some instances, the heater 212 could be a conduction heater, a convection heater, a heat pump, an immersion heater (e.g., a tank of heated fluid), a circulation heater, or the like. Any heater known in the art could be utilized as the heater 212.

Water that has been desalinated by the desalination component(s) 204 may flow from the desalination component(s) 204 to point B in the fluid circuit. In various implementations, the water flowing out of the desalination component(s) 204 may have a lower concentration of sodium and chlorine ions than the water flowing into the desalination component(s) 204.

The system 200 may include a recycle pump 214 between point B and the desalination component(s) 204. The recycle pump 214 may be configured to pump water through the fluid circuit. For instance, the recycle pump 214 may pump water in a direction from the desalination component(s) 204 to point B. The recycle pump 214 can be, for instance, at least one of a positive displacement pump, an impulse pump, a velocity pump, a steam pump, a valveless pump, or the like.

The system 200 may further include a salinity sensor 216. In various implementations, the salinity sensor 216 may measure a salinity of the water in the fluid circuit between the desalination component(s) 204 and point B. In some instances, the salinity sensor 216 may be an electrical sensor measuring electrical conductivity in the desalinated water output from the desalination component(s) 204. For instance, the salinity sensor 216 may apply a voltage over two electrodes suspended in the water fluid circuit and measure a current and/or conductivity between the electrodes. The salinity sensor 216, or some other external controller (not illustrated) may calculate the salinity of the water flowing out of the desalination component(s) 204 based on the measured current and/or conductivity.

In some cases, water output from the desalination component(s) 204 may be recycled back into the desalination component(s) 204. For instance, in a recycle mode, an outflow valve 218 may be closed and the recycle pump 214 may be activated, thereby causing the recycled water to flow from point B to point C to point A of the fluid circuit. The outflow valve 218 can include any of various types of valves. For instance, the outflow valve 218 may include at least one of a ball valve, a butterfly valve, a choke valve, a diaphragm valve, a gate valve, a globe valve, a knife valve, a needle valve, a pinch valve, a plug valve, a solenoid valve, a spool valve, or the like.

The recycled water may cycle through the desalination component(s) 204 multiple times. Accordingly, the desalination component(s) 204 may further decrease the amount of salt in the recycled water due to additional opportunities for sodium and chlorine adsorption by the iron-based desalination filter(s) in the desalination component(s) 204.

In some implementations, the salinity sensor 216, or some other component in communication with the salinity sensor 216, may be configured to activate a flow-through mode and/or the recycle mode of the system 200. The salinity sensor 216 may include one or more processors configured to execute instructions stored on memory. When executing the instructions as the system 200 is in the flow-through mode, the processor(s) may compare the measured salinity (or electrical current) to a predetermined threshold. In some cases, the threshold may correspond to a predetermined maximum salinity, such as a maximum salinity required for agricultural applications (e.g., 1,200 mg/L) and/or drinking water (e.g., 500 mg/L). If the measured salinity exceeds the maximum salinity, the processor(s) may cause the outflow valve 218 to close, thereby activating the recycle mode. In some cases, the processor(s) may further activate the pump 214 in the recycle mode. In some cases, the processor(s) may further open one or more recycle valve(s) 220 connected between points B and C in the fluid circuit in the recycle mode. The recycle valve(s) 220 can include any of various types of valves. For instance, the recycle valve(s) 220 may include at least one of a ball valve, a butterfly valve, a choke valve, a diaphragm valve, a gate valve, a globe valve, a knife valve, a needle valve, a pinch valve, a plug valve, a solenoid valve, a spool valve, or the like. When the recycle valve(s) 220 are open, the recycle pump 214 may pump the recycled water from point B to point C to point A in the fluid circuit. The processor(s) may further monitor the salinity measured by the salinity sensor 216 in the recycle mode.

If the measured salinity is lower than a threshold, the processor(s) may cause the outflow valve 218 to open, thereby activating the flow-through mode. The threshold used to activate the flow-through mode may be the same or different as the threshold used to activate the recycle mode. For instance, the threshold used to activate the flow-through mode may be 50-500 mg/L less than the threshold used to activate the recycle mode. In some cases, the processor(s) may further deactivate the recycle pump 214 in the flow-through mode. The processor(s) may further cause at least one of the recycle valve(s) 220 to close in the flow-through mode. In various implementations, the processor(s) may open or close the outflow valve 218, activate or deactivate the recycle pump 214, or the like, by transmitting one or more control signals to the recycle pump 214 and/or the outflow valve 218. Accordingly, the salinity of the water desalinated by the desalination component(s) 204 can be controlled automatically. In some implementations, the water desalinated by the desalination component(s) 204 and output from the outflow valve 218 can be output from the system 200 as desalinated water.

Although not required, in various implementations, the system 200 may further include an RO system 222. The RO system 222 may be configured to further desalinate water treated by the desalination component(s) 204. The RO system 222 can include any reverse osmosis system known in the art. In some cases, the RO system 222 may include a physical filter that captures insoluble particles in the water. The water output from the outflow valve 218 may be received on a first side of a water-permeable membrane. An RO pump 224 (or some other pump within the RO system 222) may impose a pressure on the water received from the desalination component(s) 210 (e.g., the water from the outflow valve 218). The RO pump 224 can be, for instance, at least one of a positive displacement pump, an impulse pump, a velocity pump, a steam pump, a valveless pump, or the like. Due to the pressure, substantially pure water may be output through the water-permeable membrane to a second side of the water-permeable membrane. In some cases, the substantially pure water can be output from the RO system 222 as desalinated water. In various implementations, saline retained on the first side of the membrane of the RO system 222 can be recycled through the fluid circuit. For instance, one or more RO valves 226 connected between points C and D may be opened and the RO pump 224 may reverse direction, such that saline water byproduct from the RO system 222 may be output from point D to point C to point A in the fluid circuit as recycled water, and may be recycled through the desalination component(s) 204 for further desalination. Thus, unlike other RO systems, the system 200 may refrain from producing highly saline water as a byproduct. The RO valve(s) 226 can include any of various types of valves. For instance, the RO valve(s) may include at least one of a ball valve, a butterfly valve, a choke valve, a diaphragm valve, a gate valve, a globe valve, a knife valve, a needle valve, a pinch valve, a plug valve, a solenoid valve, a spool valve, or the like.

Figure 3:
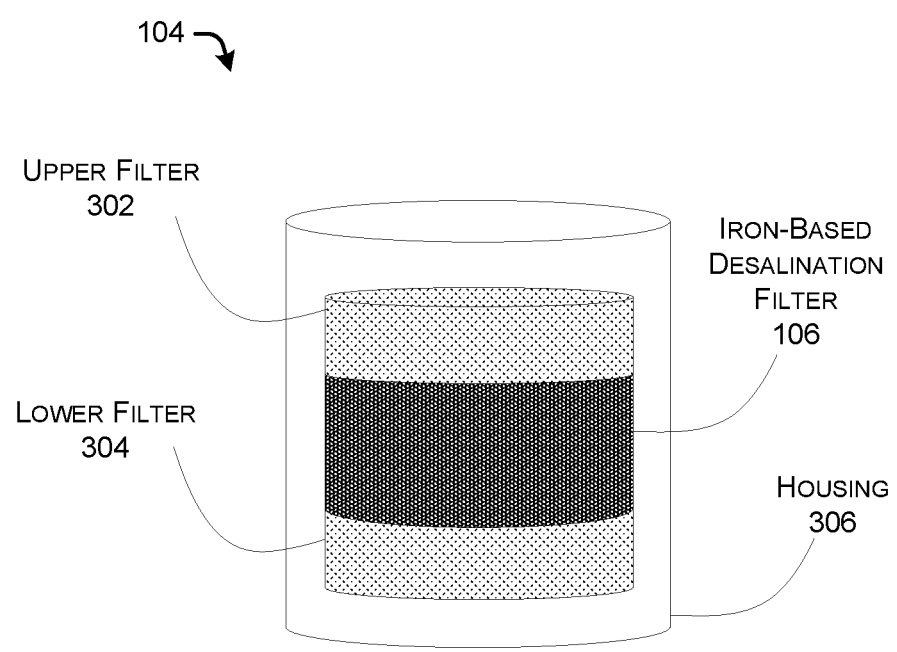
FIG. 3 illustrates an example implementation of a desalination canister.

FIG. 3 illustrates an example implementation of a desalination canister 104. The desalination canister 104 may include an upper filter 302, a lower filter, and a housing 306. As described above with reference to FIG. 1, the desalination canister 104 may further include an iron-based desalination filter 106.

In various implementations, the upper filter 302 and the lower filter 304 can be physical filters. For instance, each one of the upper filter 302 and the lower filter 304 may comprise a sieve, a sponge, or the like. The upper filter 302 and the lower filter 304 may each filter out particulate matter in water flowing through the desalination canister 104. In some cases, the upper filter 302 and the lower filter 304 may prevent iron particles from escaping the desalination canister 104.

The housing 306 may include one or more components configured to hold water in contact with the iron-based desalination filter 106. In some cases, the housing 306 includes a removable lid through which the upper filter 302, the lower filter 304, and/or the iron-based desalination filter 106 can be inserted, removed, or replaced. The housing 306 can include any water impermeable material, such as PVC, steel, or the like.

In some examples, water may flow into the desalination canister 104 through an inlet in the housing 306. The water may flow through the upper filter 302, which may remove particulate matter in the water before the water flows into the iron-based desalination filter 106. The iron-based desalination filter 106 may include iron nanoparticles configured to capture sodium and chlorine ions dissolved in the water. Once at least partially desalinated, the water may flow through the lower filter 304, which may catch particulate matter. The desalinated water may flow from the lower filter 306 out of the canister 104 through an outlet in the housing 306.

Figure 4A:
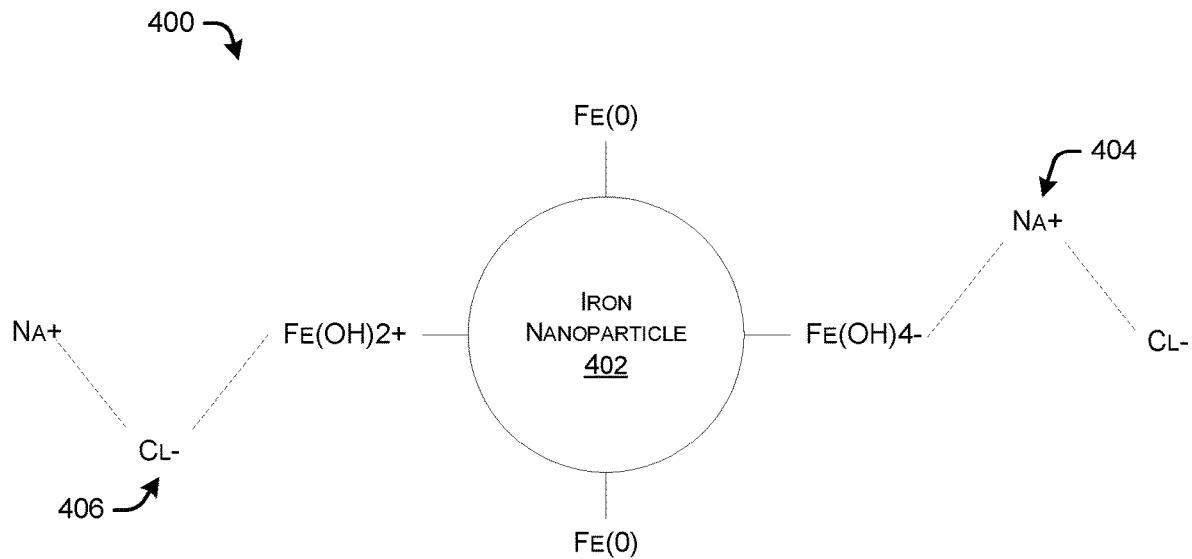
FIGS. 4A and 4B illustrate examples of iron nanoparticles configured to adsorb sodium and chlorine atoms.
Figure 4B:
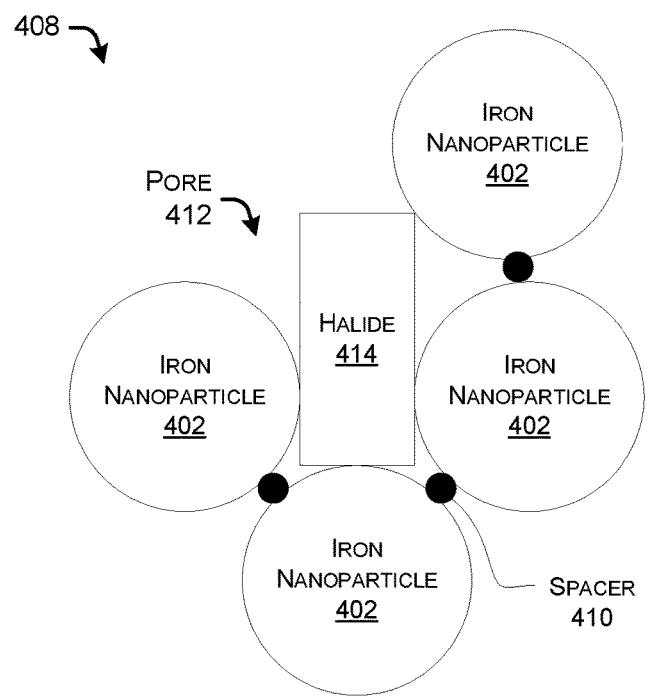

FIGS. 4A and 4B illustrate examples of iron nanoparticles configured to adsorb sodium (Na) and chlorine (Cl) atoms. FIG. 4A illustrates an example environment 400 in which an iron nanoparticle 402 captures a sodium ion ($Na^+$) 404 and a chlorine ion ($Cl^-$) 406.

The iron nanoparticle 402 may include ZVI (Fe(0)). According to various implementations, the iron nanoparticle 402 may have a mean particle size that is less than 1000 nm. For instance, the mean particle size can be calculated by observing a sample of iron nanoparticles under a microscope, measuring lengths of the iron nanoparticles in at least one direction, and then calculating an arithmetic mean of the lengths. For instance, an AMSCOPE 3.5×-180× Light Emitting Diode (LED) Zoom Digital Stereo Microscope with a 10 MP camera could be used to capture an image of the particles (e.g., in or out of solution). Image processing software can be used to perform point counting (e.g., software provided by National scientific and Technical Research Council, Buenos Aries, Argentina). The point counting software may also be used to identify the diameters of the particles.

In some cases, a length (e.g., a diameter) of the iron nanoparticle 402 may be between 10 and 100 nm, 20 to 80 nm, or 45 to 55 nm. In various implementations, the iron nanoparticle 402 may have a surface area between about 0.1 square meters per gram ($m^2/g$) to about 25 $m^2/g$. As used herein, the term "about" can refer to a range of numbers that would be rounded to the number specified. For instance, the term "about 0.1" may refer to a range of 0.05 to 0.14.

In some cases, when the iron nanoparticle 402 begins to corrode (i.e., oxidize), iron on the surfaces of the particles is hydrolyzed, and hydroxyl (—OH) groups are formed on the surfaces of the particles. The hydroxyl groups on the surfaces are amphoteric, and can have a negative charge or a positive charge depending on a pH of the solution.

According to some implementations, at least some of the ZVI on the surface of the iron nanoparticle 402 can be oxidized while immersed in water. When the ZVI becomes oxidized, two types of complexes may be formed: $FeOOH_2^+$ and $FeOOH^-$. The positively charged $FeOOH_2^+$ may electrostatically attract the negatively charged $Cl^-$ 406 dissolved in the water. The negatively charged $FeOOH^-$ may electrostatically attract the positively charged $Na^+$ 404 dissolved in the water. The electrostatic attraction between the charged complexes and the $Cl^-$ 406 and $Na^+$ 404 ions may cause a first layer of $Cl^-$ 406 and $Na^+$ 404 ions to be adsorbed onto the surface of the iron nanoparticle 402.

Once a first layer of $Na^+$ 404 and $Cl^-$ 406 is adsorbed onto the surface of the iron nanoparticle 402, additional ions may be further adsorbed onto the first layer. For instance, additional negatively charged $Cl^-$ ions 406 may be electrostatically attracted to the positively charged $Na^+$ 404 in the first layer, and additional positively charged $Na^+$ 404 may be electrostatically attracted to the negatively charged $Cl^-$ 406 in the first layer. Multiple layers of $Cl^-$ 406 and $Na^+$ 404 may assemble on the surface of the iron nanoparticle 402. In some cases, the $Cl^-$ 406 and $Na^+$ 404 may form a crystal structure.

The adsorption of the $Na^+$ 404 and $Cl^-$ 406 due to electrostatic forces with oxidized forms of iron in the nanoparticle 402 may occur relatively quickly. As $Cl^-$ 406 is attracted to, and attaches to, $Fe(OH)^{4+}$ functional groups on the surface of the iron nanoparticle 402, a subsequent, slower reaction may take place that also causes desalination. In some examples, the $Cl^-$ 406 may further catalyze the oxidation of Fe(0) in the iron nanoparticle 402. Additional $Cl^-$ 406 may diffuse through the surface layer of the iron nanoparticle 402 and cause further oxidation of the Fe(0) below the outer surface of the iron nanoparticle 402 and within the interior of the iron nanoparticle 402. Additional layers of Fe—O—Cl and Fe—O—Na may be generated within the interior of the iron nanoparticle 402.

Both reactions (the surface adsorption and capture by iron within the interior of the iron nanoparticle 402) may cause water uptake. In addition, when the iron nanoparticle 402 is submerged in water, the salinity gradient may increase as a distance to the iron nanoparticle 402 decreases, due to the capture of the $Na^+$ 404 and the $Cl^-$ 406. Accordingly, an iron-based desalination filter (e.g., the iron-based desalination filter 106) including multiple iron nanoparticles 402 may expand in size, due to water uptake and osmosis, when exposed to saline.

FIG. 4B illustrates an example environment 408 of multiple iron nanoparticles 402 capturing Na and Cl dissolved in water. The multiple iron nanoparticles 402 may be packed together. In some cases, spacers 410 may be disposed between the iron nanoparticles 402. Some examples of spacers 410 include a starch (e.g., potato starch), carboxy methyl cellulose, polyvinyl pyrrolidine, or the like. The spacers 410 may prevent the iron nanoparticles 402 from agglomerating. Although not illustrated, in some cases, at least some of the iron nanoparticles 402 may be directly touching each other.

In various implementations, a pore 412 can be present between the iron nanoparticles 402. In some cases, multiple pores 412 can be present between groups of the iron nanoparticles 402. The pore 412 may be generated based on the geometries of the iron nanoparticles 402 and the spacers 412. In various examples, the pore 412 may have a width of 20-100 nm.

When the iron nanoparticles 402 are exposed to water in which chlorine and sodium atoms are dissolved, the sodium and chlorine atoms may be adsorbed onto the surfaces of the iron nanoparticles 402. In some cases, the sodium and chlorine atoms may assemble into a halide 414 disposed within the pore 414. The halide 414 may be a crystal including the sodium and chlorine atoms.

In various implementations, the iron nanoparticles 402 can remove a significant amount of salt from water. For example, in the case of Na and Cl removal from water, a ratio of a weight or mass of Na and Cl removed from saline water by the iron nanoparticles 402 to a weight or mass of iron in the iron nanoparticles 402 (i.e., NaCl:Fe) can be as much as 20:1.

In some cases, additional contaminants can be removed from the water by the iron nanoparticles 402. For example, materials such as arsenic, selenium, metals, nitrate, chlorinated organic compounds, or the like, can also be captured by the iron nanoparticles 402.

Figure 5:
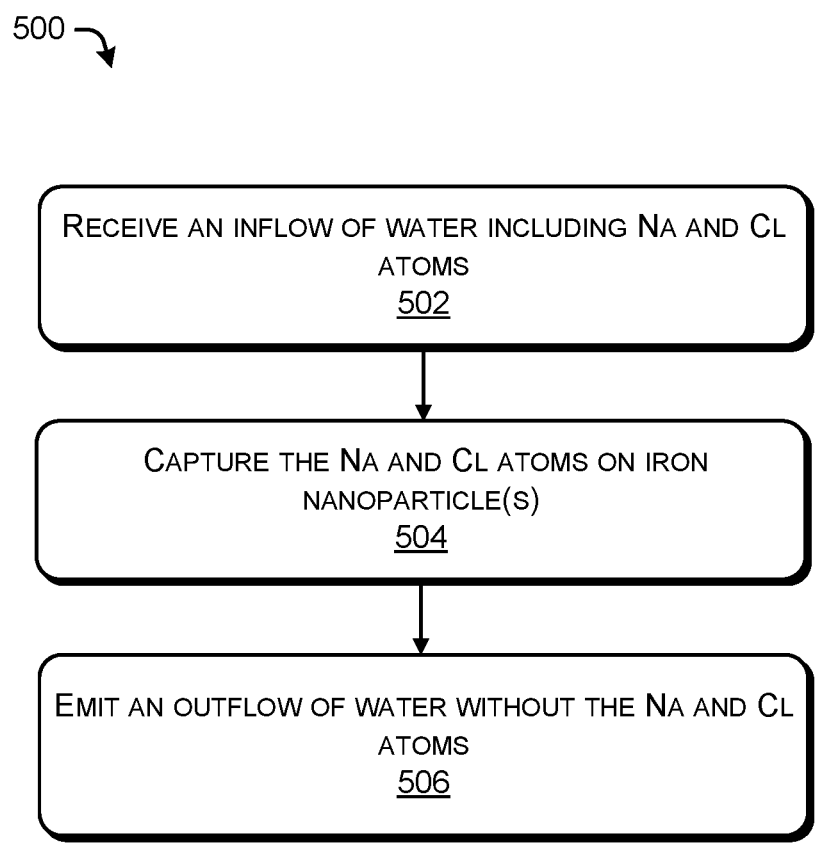
FIG. 5 illustrates an example process for iron-based water desalination.
Figure 6A:
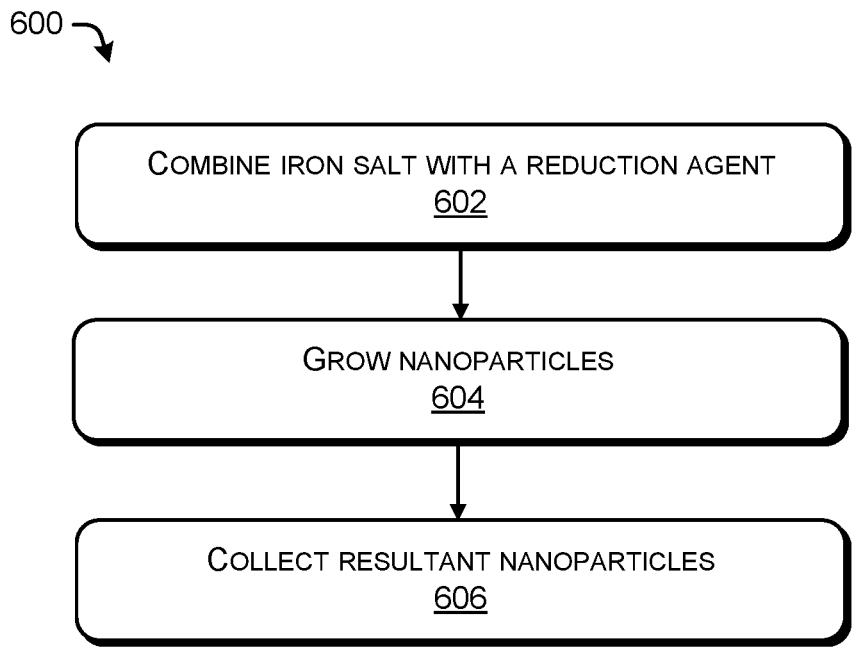
FIGS. 6A and 6B illustrate example processes for generating ZVI nanoparticles.
Figure 6B:
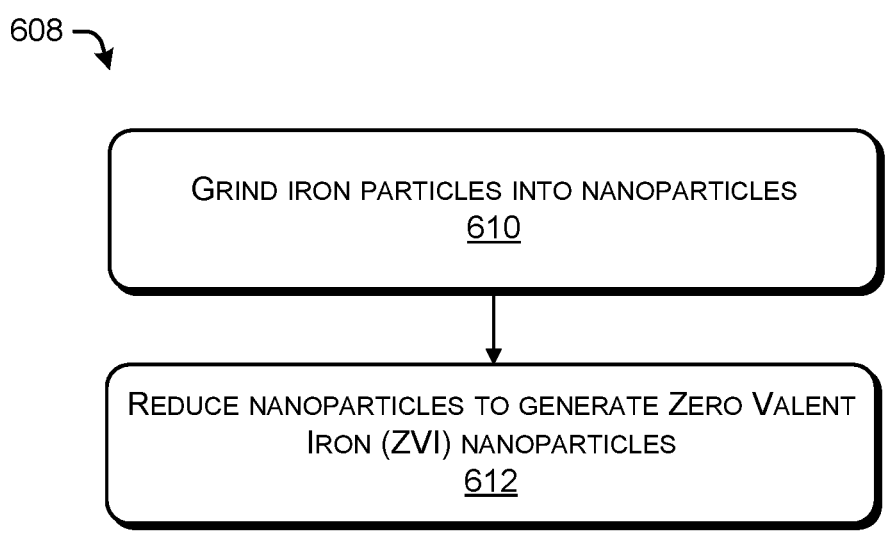

FIGS. 5, 6A, and 6B illustrate example processes in accordance with embodiments of the disclosure. These processes are illustrated as logical flow graphs, each operation of which represents a sequence of operations that can be implemented in accordance with various systems described herein. The order in which the operations are described is not intended to be construed as a limitation, and any number of the described operations can be combined in any order and/or in parallel to implement the processes.

FIG. 5 illustrates an example process 500 for iron-based desalination of water. In various implementations, the process 500 can be performed using a desalination component (e.g., the desalination component 100 described above with reference to FIG. 1), a desalination system (e.g., the desalination system 200 described above with reference to FIG. 2), a desalination canister (e.g., the desalination canister 104 described above with reference to FIGS. 1 and 3), or a combination thereof.

At 502, an inflow of water may be received. The water may include sodium (Na) and chlorine (Cl) atoms. The Na and Cl atoms may be, for instance, dissolved in the water as Na and Cl ions. The water may include other contaminants, in some case.

At 504, the Na and Cl atoms may be captured on one or more iron nanoparticles. In various implementations, the Na and Cl atoms may be adsorbed onto at least one surface of the nanoparticle(s). In some instances, the Na and Cl atoms may assemble into a network structure on the surface(s) of the nanoparticle(s). When multiple nanoparticles are used, in some cases, the Na and Cl may assemble into halite crystals in spaces (e.g., pores) present between the nanoparticles. The nanoparticle(s) may include ZVI. The ZVI may be oxidized, in some examples.

At 506, an outflow of water without the Na and Cl atoms may be emitted. The Na and Cl atoms captured on the nanoparticle(s) may be retained on the nanoparticle(s).

Accordingly, the outflow of water may have a lower concentration of Na and Cl atoms than the inflow of water.

FIGS. 6A and 6B illustrate example processes 600 and 608 for generating ZVI nanoparticles. The ZVI nanoparticles can be used to desalinate water. In some implementations, the processes 600 and 608 are performed in a substantially oxygen-free environment to prevent oxidation of the ZVI.

FIG. 6A illustrates a chemical process 600 for generating iron nanoparticles. At 602, an iron salt may be combined with a reduction agent. The iron salt may include iron in a multivalent state. For instance, ferric salts may be dissolved into water (e.g., deoxygenated water). Some examples of ferric salts include iron sulfate ($Fe_2(SO_4)_3$ and/or $FeSO_4$), iron chloride ($FeCl_2$ and/or $FeCl_3$), or the like.

The reduction agent may be, for example, an alcohol, sodium borohydride ($NaBH_4$), or the like. The reduction agent may be dissolved in water, in some cases. In some examples, the reduction agent includes a reducing gas, such as hydrogen ($H_2$), nitrogen ($N_2$), carbon monoxide (CO), methane ($CH_4$), carbon dioxide ($CO_2$), or the like.

In various examples, the alcohol solution is added to the mixture. The alcohol may be, for example, a methanol solution, an ethanol solution, a phenol solution, or the like. For instance, the phenol solution could include blueberry extracts in ethyl alcohol, green tea in alcohol, any vegetative matter that will produce flavonoids and/or phenols upon extraction in simple alcohols, or a combination thereof. In some cases, the alcohol solution includes one or more phenolic extracts.

In some cases, a stabilizer (also referred to as a "spacer") can be added to a solution containing the ferric salts and the reduction agent. The stabilizer may include at least one of a starch, a potato starch, a soybean protein, polyacrylamide, carboxymethyl cellulose, polyvinyl pyrrolidine, a synthetic stabilizer, or a combination thereof. In various implementations, the stabilizer may prevent the nanoparticles from agglomerating to each other. In some cases, the stabilizer may ensure that the iron nanoparticles are packed together with many small pores, rather than fewer large pores.

At 604, nanoparticles may be grown. The alcohol solution may reduce the iron in the iron salts. In some instances, the multivalent iron in the iron salts may be reduced to ZVI. The ZVI, once generated, may precipitate into the nanoparticles. The reaction may be allowed to continue until the nanoparticles are grown to a suitable size. For instance, the nanoparticles may be grown until they have a length that is 10 to 100 nm, 20 to 80 nm, about 50 nm, or the like. In some cases, the ZVI nanoparticles may be grown in the presence of a reducing agent, such as $H_2$, $N_2$, CO, $CH_4$, $CO_2$, or the like.

At 606, the resultant nanoparticles may be collected. In some implementations, the solution is subsequently centrifuged, and the nanoparticles are collected, filtered (e.g., by flowing the solution through a passive filter), washed and rewashed with alcohol (e.g., ethanol), collected, and then freeze-dried. In some cases, the nanoparticles may be pretreated with one or more reducing substances to maximize Fe(0) on the nanoparticle surfaces.

FIG. 6B illustrates a physical process 608 for generating iron nanoparticles. At 610, iron particles are ground into nanoparticles. In some cases, the iron particles include metallic iron. The iron particles may be micron-sized (e.g., micro) ZVI particles, in some cases. According to various examples, the micron-sized ZVI particles may be ground by a tungsten-carbide grinder.

At 612, iron in the nanoparticles is reduced to generate ZVI. During the grinding process, the iron in the particles may become oxidized. Accordingly, by reducing the iron, the resultant particles can become substantially ZVI.

Figure 7:
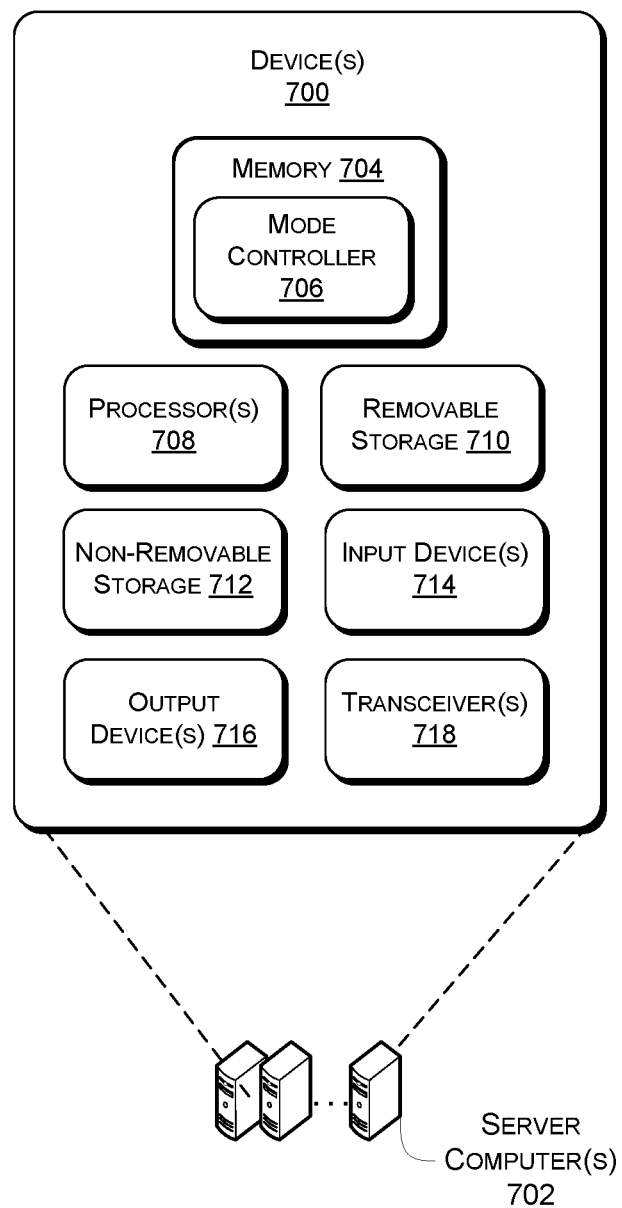
FIG. 7 illustrates at least one example device configured to enable and/or perform various functionality discussed herein.

FIG. 7 illustrates at least one example device 700 configured to enable and/or perform various functionality discussed herein. Further, the device(s) 700 can be implemented as one or more server computers 702, a network element on a dedicated hardware, as a software instance running on a dedicated hardware, or as a virtualized function instantiated on an appropriate platform, such as a cloud infrastructure, and the like. It is to be understood in the context of this disclosure that the device(s) 700 can be implemented as a single device or as a plurality of devices with components and data distributed among them.

As illustrated, the device(s) 700 comprise a memory 704. In various embodiments, the memory 704 is volatile (including a component such as Random Access Memory (RAM)), non-volatile (including a component such as Read Only Memory (ROM), flash memory, etc.) or some combination of the two.

The memory 704 may include various components, such as at least one mode controller 706. The mode controller(s) 706 can comprise methods, threads, processes, applications, or any other sort of executable instructions. The mode controller(s) 706 can also include files and databases.

The memory 704 may include various instructions (e.g., instructions in the mode controller(s) 706), which can be executed by at least one processor 708 to perform operations. In some embodiments, the processor(s) 708 includes a Central Processing Unit (CPU), a Graphics Processing Unit (GPU), or both CPU and GPU, or other processing unit or component known in the art.

The device(s) 700 can also include additional data storage devices (removable and/or non-removable) such as, for example, magnetic disks, optical disks, or tape. Such additional storage is illustrated in FIG. 7 by removable storage 710 and non-removable storage 712. Tangible computer-readable media can include volatile and nonvolatile, removable and non-removable media implemented in any method or technology for storage of information, such as computer readable instructions, data structures, program modules, or other data. The memory 704, removable storage 710, and non-removable storage 712 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 700. Any such tangible computer-readable media can be part of the device(s) 700.

The device(s) 700 also can include input device(s) 714, such as a keypad, a cursor control, a touch-sensitive display, voice input device, etc., and output device(s) 716 such as a display, speakers, printers, etc. These devices are well known in the art and need not be discussed at length here. In particular implementations, a user can provide input to the device(s) 700 via a user interface associated with the input device(s) 714 and/or the output device(s) 716.

As illustrated in FIG. 7, the device(s) 700 can also include one or more wired or wireless transceiver(s) 718. For example, the transceiver(s) 718 can include a Network Interface Card (NIC), a network adapter, a LAN adapter, or a physical, virtual, or logical address to connect to the various base stations or networks contemplated herein, for example, or the various user devices and servers. To increase throughput when exchanging wireless data, the transceiver(s) 718 can utilize Multiple-Input/Multiple-Output (MIMO) technology. The transceiver(s) 718 can include any sort of wireless transceivers capable of engaging in wireless, Radio Frequency (RF) communication. The transceiver(s) 718 can also include other wireless modems, such as a modem for engaging in Wi-Fi, WiMAX, Bluetooth, or infrared communication. In some implementations, the transceiver(s) 718 can be used to communicate between various functions, components, modules, or the like, that are comprised in the device(s) 700.

The device(s) 700 may be in communication with at least one of the recycle pump 214, the salinity sensor 216, the outflow valve 218, the recycle valve(s) 220, the RO pump 224, and the RO valve(s) 226 described above with reference to FIG. 2. In various implementations, the processor 708 executing the cycle controller(s) 706 may control at least one of the recycle pump 214, the outflow valve 218, the recycle valve(s) 220, the RO pump 224, and the RO valve(s) 226. In some examples, the device(s) 700 may be part of the salinity sensor 216.

In some cases, the processor 706 may identify measurements taken by the salinity sensor 216. For instance, if one or more measurements taken by the salinity sensor 216 are above a first threshold, the processor(s) 708 executing the cycle controller(s) 706 may activate a recycle mode in which the processor(s) 708 generate a signal to close the outflow valve 218, a signal to open the recycle valve(s) 220, a signal to activate the recycle pump 214, or any combination thereof. In some examples, if one or more measurements taken by the salinity sensor 216 are below a second threshold, the processor(s) 708 executing the cycle controller(s) 706 may activate a flow-through mode in which the processor(s) 708 generate a signal to open the outflow valve 218, a signal to close the recycle valve(s) 220, a signal to deactivate the recycle pump, or any combination thereof. In some cases, the processor 706 may selectively generate signals to open or close the RO valve(s) 226 and/or activate or deactivate the RO pump 224. In some examples, the processor 706 can selectively activate the injector 208 according to one or more conditions (e.g., a user input received at the input device(s) 714). In some cases, the transceiver(s) 718 can communicate the signals between the processor(s) 708 and the outflow valve 218, the recycle valve(s) 220, the recycle pump 214, the RO pump 224, the RO valve(s) 226, or any combination thereof.

Figure 8B:
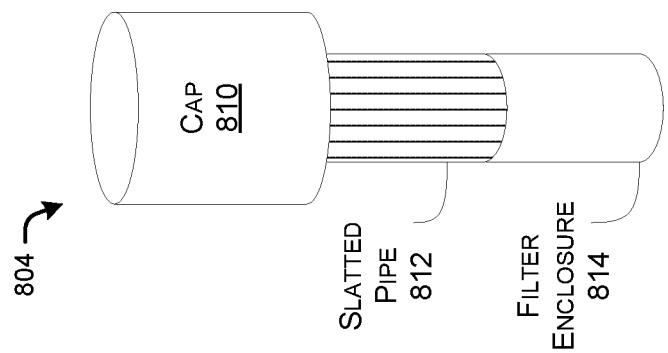
FIGS. 8A and 8B illustrate an example of a two-component desalination canister.
Figure 8A:
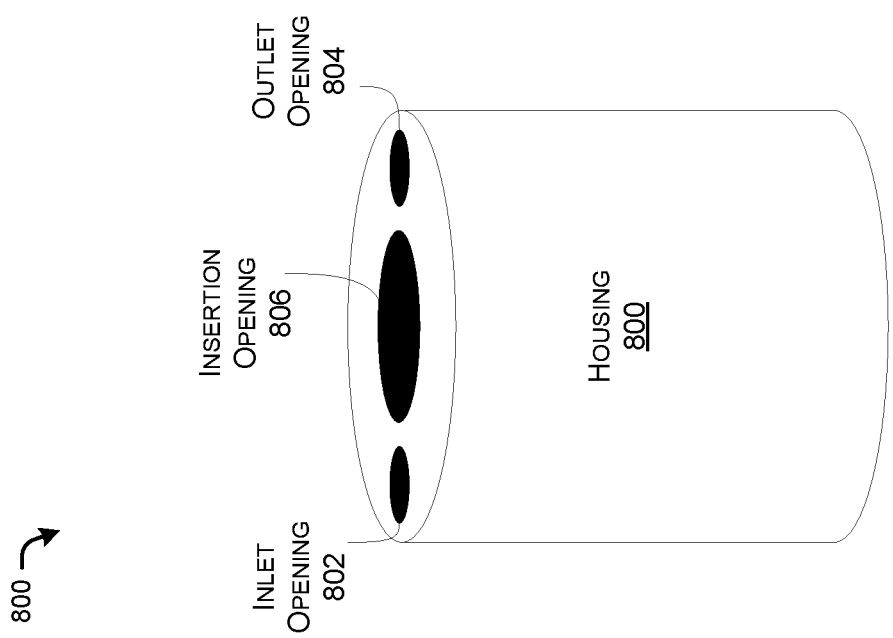

FIGS. 8A and 8B illustrate an example of a two-component desalination canister. FIG. 8A illustrates an example of a housing 800 of the desalination cannister. In various implementations, the housing 800 may include a hollow structure. As illustrated in FIG. 8A, the housing 800 is cylindrical, but implementations are not so limited.

The housing 800 can include an inlet opening 802, an outlet opening 804, and an insertion opening 806. The inlet opening 802 and/or the outlet opening 804 may be attached to one or more tubes, pipes, or the like, in a fluid circuit. For instance, saline and/or desalinated water may flow through at least one of the inlet opening 802 or the outlet opening 804. In some cases, saline may enter the inlet opening 802 and remain held in an interior space of the housing 800. The housing 800 may include at least one water impermeable material, such as PVC. In some cases, a the interior space of the housing 800 may hold 1-200 L of water.

A media rod including an iron-based desalination filter may be inserted into the space via the insertion opening 806. In some cases, the insertion opening 806 may be a threaded opening, such that the media rod can be screwed onto the insertion opening 806 and the iron-based desalination filter can be suspended in the interior of the housing 800. Accordingly, the saline held inside of the housing 800 may be passively desalinated by the iron-based desalination filter.

FIG. 8B illustrates an example of a media rod 808 including an iron-based desalination filter. As illustrated, the media rod 808 includes a cap 810, a slatted pipe 812, and a filter enclosure 814. The media rod 808 may include at least one water impermeable material, such as PVC.

The cap 810, in some cases, may fasten onto the housing 800. For instance, the cap 810 may be threaded and may screw onto the insertion opening 806 of the housing 800. In some cases, the cap 810 may have a larger width than the insertion opening 806, such that the cap 810 may not fit through the insertion opening 806.

The slatted pipe 812 may include a hollow structure with one or more sidewalls. Slats, holes, or the like, may be present in the one or more sidewalls of the slatted pipe 812. In various implementations, water (e.g., saline) may flow through the salts and/or holes in the slatted pipe 812.

The filter enclosure 814 may include one or more walls that are continuous with the wall(s) of the slatted pipe 812. The filter enclosure 814 may be a vessel with a hollow space holding the iron-based desalination filter. In some cases, one side of the filter enclosure 814 may be open, such that water that has flowed through the slatted pipe 812 can enter the hollow space. The remaining sides of the filter enclosure 814 may be closed, such that the iron-based desalination filter may be held in place. In various implementations, when the media rod 808 is at least partly inserted into the housing 800, and saline is present inside of the housing 800, the saline may flow through the slatted pipe 812 and come into contact with the iron-based desalination filter in the filter enclosure 812. The iron-based desalination filter may capture sodium and chlorine ions in the saline, thereby desalinating the saline.

Figure 9:
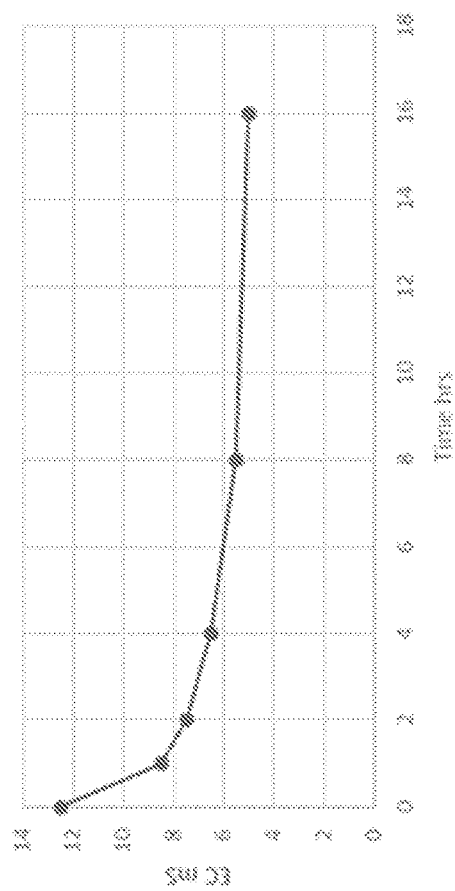
FIG. 9 illustrates results of an experimental example of iron-based desalination using iron nanoparticles.
Figure 10:
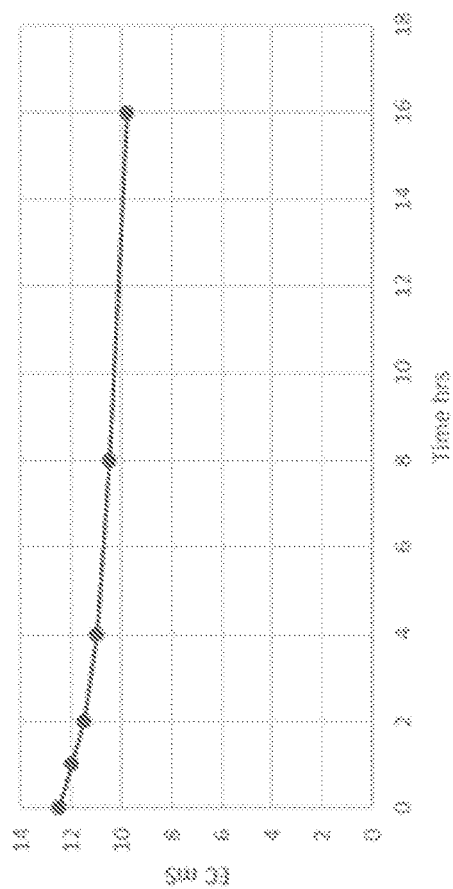
FIG. 10 illustrates results of an experimental example of iron-based desalination using iron microparticles.

FIGS. 9 and 10 illustrate the comparative effectiveness of iron nanoparticles versus iron microparticles at desalinating water, according to some experimental examples. In both examples, a solution of saline was prepared. The saline included water with 6 grams of NaCl dissolved per liter.

FIG. 9 illustrates results 900 of an experimental example of iron-based desalination using iron nanoparticles. To prepare the results 900 illustrated in FIG. 9, 10 grams (g) of ZVI nanoparticles were added to a 500 mL of water in a flask. The ZVI nanoparticles and the water comprised a slurry.

The ZVI nanoparticles had diameters of about 50 nm. The diameters were calculated using a sedimentation method. For instance, sedimentation was performed by American Society for Testing and Materials (ASTM) Method D7928, wherein particle size calculations are derived from Stokes' law. In this experiment, the diameters were calculated using a 1 L graduated cylinder and a glass pipette for withdrawing samples at a specified depth, in accordance with ASTM Method D7928.

The saline was added to the 500 mL flask. An Electrical Conductivity (EC) (measured in millisiemens (mS)) was monitored through the saline in the 500 mL flask. The EC was at least partially proportional to the salinity of the solution. For instance, 1 mS may be equivalent to a salinity of 0.54 mg/L.

As illustrated in FIG. 9, the measured EC dropped as the saline was exposed to the slurry of iron nanoparticles. In particular, a precipitous drop from an EC of over 12 mS to an EC of less than 9 mS occurred within the first hour of the experiment. Eventually, at about 16 hours after the introduction of the saline to the ZVI nanoparticles, the EC level dropped to about 5 mS. Accordingly, the iron nanoparticles significantly reduced the salinity of the saline in the flask.

FIG. 10 illustrates results 1000 of an experimental example of iron-based desalination using iron microparticles. To prepare the results 1000 illustrated in FIG. 10, 10 g of ZVI microparticles were combined with 100 mL of water and held in a 500 mL flask. The ZVI microparticles had diameters of about 55 microns (e.g., calculated using ASTM Method D7928). The saline was added to the 500 mL flask. An EC was monitored through the saline of the 500 mL flask. The EC was at least partially proportional to the salinity of the solution.

As illustrated in FIG. 10, the iron microparticles reduced the salinity of the solution. However, the iron microparticles did not reduce the salinity as quickly or as effectively as the iron nanoparticles. For instance, after 16 hours, the EC was reduced from over 12 mS to under 10 mS. However, over the course of 16 hours, the iron microparticles did not reduce the salinity of the solution as much as the iron nanoparticles within the first hour of exposure to the solution.

FIGS. 9 and 10 illustrate that the particle size of ZVI used to desalinate water is indirectly proportional to the speed and/or effectiveness at which the ZVI desalinates water. In some implementations, it is suspected that the total surface area of the particles may correlate to the speed and/or effectiveness at which the particles desalinate water. Furthermore, it has been observed that relatively large ZVI particles may have a negligible effect on desalination.

Approximately 100 tests have been performed by the inventor to determine the efficiency of sodium and chlorine removal by iron particles. In general, these tests suggest the following:
  a. The finer (smaller) the particles, the more sodium and chlorine can be removed from saline
  b. The greater the porosity between the particles, the more sodium and chlorine can be removed from saline
  c. The greater the size of the particles in contact with saline, the longer the salinity takes to reach equilibrium
  d. With relatively fine particles (e.g., nanoparticles), sodium and chlorine levels in water reach equilibrium after about 24 hours of being exposed to the fine particles In various tests, about 60% of sodium and chlorine in water can be removed from the water within 24 hours by iron nanoparticles when the following conditions are present:
  a. The iron nanoparticles include ZVI produced by the reduction of ferrous or ferric salts with $NaBH_4$
  b. The iron nanoparticles have an average size of 20 nm
  c. The iron nanoparticles are packed into a cylinder or puck, wherein the width of the puck (in a direction crossing a direction of gravity) does not exceed the height of the puck (in the direction of gravity)
  d. The iron nanoparticles are present in a ratio of 5 to 20 grams per liter of saline to be treated
  e. The saline is cycled from a space holding the iron nanoparticles at a constant flow rate
  f. The saline to be treated has a pH in a range from 7 to 9

Conditions a through f have been successfully shown to reduce about 60% of the sodium and chlorine from the saline with a single desalination component.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A desalination system comprising:
   a plurality of iron nanoparticles comprising Zero Valent Iron (ZVI); and
   spacers disposed between the plurality of iron nanoparticles, geometries of the plurality of iron nanoparticles and the spacers providing pores between the iron nanoparticles, a width of the pores being in a range of about 20 nanometers to about 100 nanometers.

2. The desalination system of claim 1, wherein a Z-average diameter of the iron nanoparticles is in a range of about 20 nanometers to about 80 nanometers.

3. The desalination system of claim 1, wherein the spacers comprise at least one of a potato starch, a soybean protein, polyacrylamide, carboxymethyl cellulose, or polyvinyl pyrrolidine.

4. The desalination system of claim 1, further comprising:
   a housing comprising a water impermeable material disposed at least partially around the plurality of nanoparticles and the spacers.

5. The desalination system of claim 4, further comprising:
   a pump configured to pump saline into the housing or to pump desalinated water out of the housing.

6. The desalination system of claim 4, further comprising:
   a tank configured to hold saline, the tank being disposed at a higher elevation than the housing; and
   a valve configured to selectively pass the saline from the tank into the housing.

7. A passive desalination method, comprising:
   receiving an inflow of saline comprising water, sodium ions, and chloride ions;
   capturing, by a plurality of iron nanoparticles, the sodium ions and the chloride ions, the iron nanoparticles comprising Zero Valent Iron (ZVI), wherein capturing the chlorine ions and the sodium ions comprises forming halite in pores between the iron nanoparticles, the halite comprising the chlorine ions and the sodium ions; and
   emitting an outflow of the water.

8. The passive desalination method of claim 7, wherein spacers are disposed between the plurality of iron nanoparticles and provide the pores between the iron nanoparticles.

9. The passive desalination method of claim 8, wherein the spacers comprise at least one of a potato starch, a soybean protein, polyacrylamide, carboxymethyl cellulose, or polyvinyl pyrrolidine.

10. The passive desalination method of claim 7, wherein the inflow is driven by gravity acting on the saline.

11. The passive desalination method of claim 7, wherein a Z-average diameter of the iron nanoparticles is in a range of about 20 nanometers to about 80 nanometers.

12. The passive desalination method of claim 7, wherein the inflow of the saline has a Total Dissolved Solids (TDS) level of greater than 1,500 mg/L and the outflow of the water has a TDS level of 1,200 mg/L or less.

13. The passive desalination method of claim 7, wherein the inflow of the saline has a first Total Dissolved Solids (TDS) level and the outflow of the water has a second TDS level, the second TDS level being one half or less of the first TDS level.

14. A desalination method, comprising:
   receiving an inflow of saline comprising water, sodium ions, and chloride ions;
   desalinating the saline by capturing, by a plurality of iron nanoparticles, the sodium ions and the chloride ions, wherein capturing the sodium ions and the chloride ions comprises converting Zero Valent Iron (ZVI) in the iron nanoparticles into multivalent iron; and
   emitting an outflow of the desalinated water.

15. The desalination method of claim 14, wherein spacers are disposed between the plurality of iron nanoparticles and provide pores between the iron nanoparticles.

16. The desalination method of claim 15, wherein the spacers comprise at least one of a potato starch, a soybean protein, polyacrylamide, carboxymethyl cellulose, or polyvinyl pyrrolidine.

17. The desalination method of claim 14, wherein the inflow is driven by gravity acting on the saline.

18. The desalination method of claim 14, wherein a Z-average diameter of the iron nanoparticles is in a range of about 20 nanometers to about 80 nanometers.

19. The desalination method of claim 14, wherein capturing the chlorine ions and the sodium ions comprises forming halite in pores between the iron nanoparticles, the halite comprising the chlorine ions and the sodium ions.

20. The desalination method of claim 14, wherein the inflow of the saline has a first Total Dissolved Solids (TDS) level and the outflow of the water has a second TDS level, the second TDS level being one half or less of the first TDS level.

* * * * *